(12) United States Patent
Kim (10) Patent No.: US 8,590,677 B2
(45) Date of Patent: Nov. 26, 2013

(54) SHOCK ABSORBER

(75) Inventor: Nam Ho Kim, Bucheon-si (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/547,960

(22) Filed: Jul. 12, 2012

(65) Prior Publication Data

US 2012/0325604 A1    Dec. 27, 2012

Related U.S. Application Data (62) Division of application No. 12/328,688, filed on Dec. 4, 2008, now abandoned.

(30) Foreign Application Priority Data

Dec. 5, 2007  (KR) .................. 10-2007-0125534
Dec. 5, 2007  (KR) .................. 10-2007-0125535

(51) Int. Cl.
*F16F 9/49*   (2006.01)

(52) U.S. Cl.
USPC .................................... 188/280; 188/322.15

(58) Field of Classification Search
USPC ................. 188/322.13, 322.15, 322.22, 280
See application file for complete search history.

(56) References Cited

U.S. PATENT DOCUMENTS

| | | | |
|---|---|---|---|
| 3,896,908 A | 7/1975 | Petrak | |
| 4,396,098 A | 8/1983 | Petrak | |
| 5,848,677 A * | 12/1998 | Beck et al. | 188/322.22 |
| 5,971,117 A | 10/1999 | Grundei et al. | |
| 6,561,326 B2 | 5/2003 | Gotz | |
| 6,651,787 B2 | 11/2003 | Grundei | |
| 7,100,750 B2 | 9/2006 | Drees | |
| 7,172,058 B2 | 2/2007 | Burkert et al. | |
| 7,255,211 B2 | 8/2007 | Götz et al. | |
| 7,441,639 B2 | 10/2008 | Götz et al. | |
| 7,628,256 B2 | 12/2009 | Krefeld | |
| 8,028,813 B2 | 10/2011 | Kim | |
| 2005/0133319 A1 | 6/2005 | Wilhelm | |

FOREIGN PATENT DOCUMENTS

| | | | | |
|---|---|---|---|---|
| GB | 2111171 A | * | 6/1983 | ............... F16F 9/50 |
| JP | 56024313 A | | 3/1981 | |
| KR | 20050118405 A | | 12/2005 | |
| KR | 20070078147 A | | 7/2007 | |

* cited by examiner

*Primary Examiner* — Bradley King
*Assistant Examiner* — Nicholas J Lane
(74) *Attorney, Agent, or Firm* — McDermott Will & Emery LLP (57) ABSTRACT

Disclosed herein is a shock absorber for damping vibration transmitted to a vehicle according to a road state. The shock absorber includes a cylinder and a piston valve disposed within the cylinder and connected to a piston rod. The piston rod includes a hollow chamber formed within the piston rod, a floating piston disposed within the hollow chamber to move up and down and to divide the hollow chamber into upper and lower chambers, and a moving mechanism formed in the hollow chamber to move an operating fluid to upper and lower portions of the floating piston. The shock absorber can change a damping force according to a displacement of the piston rod, thereby improving driving comfort and stability of the vehicle.

4 Claims, 9 Drawing Sheets

SHOCK ABSORBER

RELATED APPLICATIONS

This application is a Divisional of U.S. application Ser. No. 12/328,688, filed on Dec. 4, 2008 now abandoned, claiming priority of Korean Patent Application Nos. 10-2007-0125534 and 10-2007-0125535 filed on Dec. 5, 2007, the entire contents of each of which are hereby incorporated by reference.

BACKGROUND OF THE INVENTION

1. Technical Field

The present disclosure generally relates to shock absorbers for damping vibration transmitted to a vehicle according to a road state and, more particularly, to a shock absorber capable of changing a damping force according to a displacement of a piston rod.

2. Description of the Related Art

Generally, a vehicle is provided with a suspension system for enhancing driving comfort by buffering impact or vibration transmitted to an axle from a road during driving. One component constituting the suspension system is a shock absorber. The shock absorber is disposed between the axle and a vehicle body. The shock absorber includes a cylinder and a piston rod reciprocating within the cylinder. The cylinder is filled with an operating fluid, such as gas or oil, such that the operating fluid is moved by a piston valve secured to one end of the piston rod to generate a damping force.

A conventional shock absorber has a restriction in that it exhibits constant damping force characteristics with respect to variation of a road state or a driving posture of the vehicle. Therefore, a low damping force characteristic can improve driving comfort but does not ensure stability of the vehicle, whereas a high damping force characteristic can maintain the stable posture of the vehicle but entails deterioration of driving comfort. As such, the conventional shock absorber is incapable of controlling damping force characteristics in response to variation of the road state or the posture of the vehicle.

Accordingly, in order to solve the problem of such a conventional shock absorber, a shock absorber capable of providing variable damping force characteristics according to a displacement of the piston rod has been developed.

Figure 1:
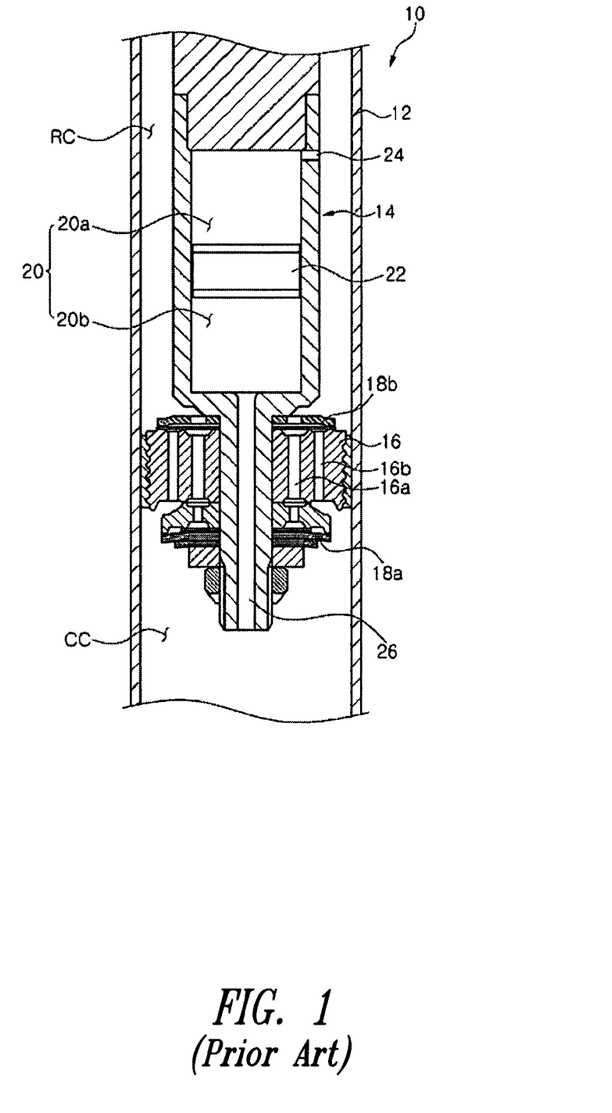
FIG. 1 is a cross-sectional view of a portion of a conventional shock absorber.

FIG. 1 is a cross-sectional view of a portion of a conventional shock absorber.

Referring to FIG. 1, the shock absorber 10 includes a piston rod 14 connected to a vehicle body, and a cylinder 12 secured to an axle connected to wheels. The piston rod 14 reciprocates within the cylinder 12.

The piston rod 14 includes a piston valve 16 disposed at a lower end of the piston rod 14 to divide the interior of the cylinder 12 into a tensile chamber RC and a compression chamber CC. The piston valve 16 is formed with tensile orifices 16a and compression orifices 16b through which the tensile chamber RC and the compression chamber CC communicate with each other. The shock absorber 10 further includes disc valves 18a and 18b disposed on upper and lower sides of the tensile orifices 16a and the compression orifices 16b to elastically deform and generate a damping force according to movement of an operating fluid.

The piston rod 14 has a hollow chamber 20 formed therein. The hollow chamber 20 is provided with a floating piston 22 that can move up and down and divides the hollow chamber 20 into an upper chamber 20a and a lower chamber 20b. The hollow chamber 20 has a first orifice that is defined by a through-hole 24 through which an upper portion of the upper chamber 20a communicates with the tensile chamber RC, and a second orifice that is defined by a shaft hole 26 through which a lower portion of the lower chamber 20b communicates with the compression chamber CC.

As the piston rod 14 is slightly displaced, the floating piston 22 is lifted or lowered, and the operating fluid flows into or from the first or second orifice through the through-hole 24 or the shaft hole 26. As a result, the damping force of the shock absorber 10 is lowered.

The conventional shock absorber 10 reduces the damping force at a low displacement and low speed. However, the hollow chamber 20 has a restricted size so that a range of motion of the floating piston 22 is limited, thereby providing a low effect in reduction of the damping force. Further, when increasing the size of the hollow chamber 20 to improve the effect of reducing the damping force, there are problems of a manufacturing cost increase and a durability deterioration of the piston rod 14. Additionally, the conventional shock absorber undergoes friction between the outer surface of the floating piston and the inner surface of the hollow chamber while the floating piston moves up and down within the hollow chamber to cause an inefficient initial movement and a stick slip phenomenon between the floating piston and the hollow chamber, thereby lowering driving comfort. Furthermore, when the floating piston contacts the upper end or the lower end of the upper chamber or the lower chamber, the conventional shock absorber generates noise, thereby deteriorating quality satisfaction.

BRIEF SUMMARY

According to one aspect a shock absorber is provided that includes a floating piston disposed within a hollow chamber of a piston rod to reduce a damping force and can significantly reduce the damping force in a section where the piston rod moves repetitiously.

Another aspect of the present invention is to provide a shock absorber that can gradually reduce the damping force according to a displacement of the piston rod.

A further aspect of the present invention is to provide a shock absorber that can prevent a stick slip phenomenon.

According to one embodiment, a shock absorber includes a cylinder, and a piston valve connected to a piston rod within the cylinder to divide the cylinder into a first chamber and a second chamber. The shock absorber further includes a hollow chamber formed within the piston rod; first and second orifices formed in upper and lower ends of the hollow chamber and connected to the first and second chambers, respectively; a floating piston disposed within the hollow chamber to move up and down and to divide the hollow chamber into upper and lower chambers; and a moving mechanism formed in the hollow chamber to move an operating fluid above and below the floating piston.

In accordance with one aspect, the moving mechanism disposed within the hollow chamber may be a bypass passage formed longitudinally in the hollow chamber to allow the upper chamber and the lower chamber to communicate with each other through the bypass passage. The shock absorber may further include an upper spring and a lower spring provided to the upper chamber and the lower chamber to elastically support upper and lower surfaces of the floating piston, respectively. The upper and lower springs may be coil springs. The upper and lower springs may be conical coil springs, each having a gradually decreasing radius toward the floating piston. The upper and lower surfaces of the floating piston may be formed with mounting protrusions into which the upper and lower springs are fitted, respectively. The bypass passage may be a groove formed to have a predetermined length in the hollow chamber. The bypass passage may be an internal passage formed to have a predetermined length in the piston rod to connect the upper chamber and the lower chamber within the hollow chamber.

In accordance with another aspect of the invention, the moving mechanism disposed within the hollow chamber may be a flexible moving plate disposed within the floating piston to be deformed toward the upper or lower chamber. The floating piston may include a ring, the ring having an inner surface, on which an outer circumference of the flexible moving plate is disposed, and an outer surface contacting an inner surface of the hollow chamber, and the flexible moving plate comprises a bent part having an outer circumference disposed on the inner surface of the ring, the bent part being symmetrically formed with respect to a center of the bent part and alternately bent up and down. The bent part may be thin near the ring and thick at the center of the bent part.

BRIEF DESCRIPTION OF THE SEVERAL VIEWS OF THE DRAWINGS

The above and other aspects, features and advantages of the present invention will become apparent from the following description of some embodiments given in conjunction with the accompanying drawings, in which.

DETAILED DESCRIPTION

Some embodiments of the present invention will be described in detail with reference to the accompanying drawings hereinafter.

Figure 2:
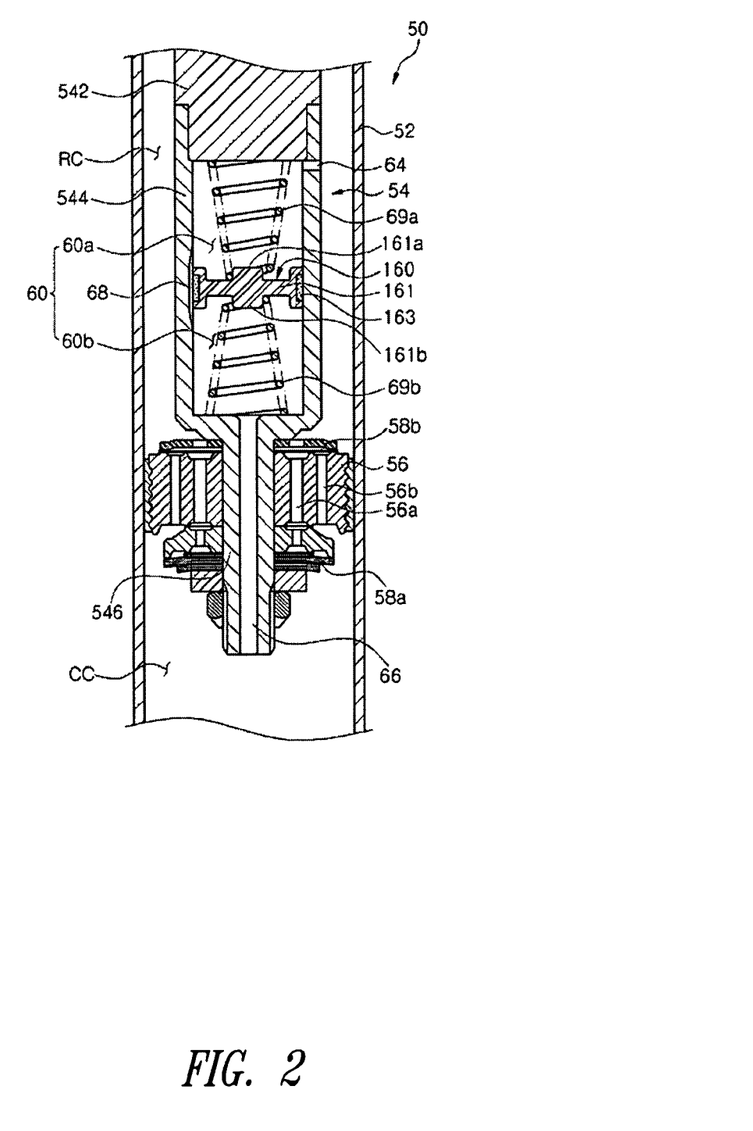
FIG. 2 is a cross-sectional view of a portion of a shock absorber according to one embodiment.

FIG. 2 is an enlarged cross-sectional view of a portion of a shock absorber according to one embodiment.

In FIG. 2, a shock absorber 50 includes a cylinder 52 connected to an axle of the vehicle and a piston rod 54 connected to a vehicle body side. The piston rod 54 is disposed within the cylinder 52 to reciprocate therein and includes a piston valve 56 disposed at one end of the piston rod 54 to divide the interior of the cylinder 52 into a compression chamber CC and a tensile chamber RC. The piston valve 56 is formed with tensile orifices 56a and compression orifices 56b through which the tensile chamber RC communicates with the compression chamber CC. Further, a plurality of disc valves 58a and 58b are located on upper and lower surfaces of the piston valve 56 to elastically deform and generate a damping force according to movement of an operating fluid.

The piston rod 54 has a cylindrically elongated hollow chamber 60 therein. The hollow chamber 60 is provided with a floating piston 160 that can move up and down therein. Upper and lower ends of the hollow chamber 60 are formed with first and second orifices 64, 66 that are in fluid communication with the tensile chamber RC and the compression chamber CC, respectively.

Here, the floating piston 160 divides the hollow chamber 60 into upper and lower chambers 60a and 60b, and reduces a damping force while moving up and down by the operating fluid that flows through the first and second orifices.

A body 161 of the floating piston 160 is provided on the outer circumference thereof with a friction reducing member 163 which contacts an inner surface of the hollow chamber 60 to reduce friction between the floating piston 160 and the hollow chamber 60 while the floating piston 160 moves in the hollow chamber 60. The friction reducing member 163 may comprise Teflon resin.

Additionally, the hollow chamber 60 has a bypass passage formed longitudinally to allow the upper and lower chambers 60a and 60b to communicate with each other through the bypass passage. Accordingly, when the piston rod 54 is moved in a slight displacement section within the hollow chamber 60, since the upper and lower chambers 60a and 60b of the hollow chamber 60 communicate with each other through the bypass passage, the operating fluid in one of the tensile chamber RC and the compression chamber CC moves to the other chamber, thereby generating a low damping force.

For this purpose, the piston rod 54 includes a main rod 542, and a rod extension 544 which is provided to one end of the main rod 542 and has a hollow interior, one end of which is opened to form an opening of the rod extension 544.

The main rod 542 has a stepped end such that the opening of the rod extension 544 is secured to the stepped end of the main rod 542. Further, the other end of the rod extension 544 is formed with a neck 546 which extends longitudinally and is stepped in a small outer diameter to couple the piston valve 56 thereto.

The hollow chamber 60 is formed toward the upper end thereof with the first orifice 64, which communicates with the tensile chamber RC and is defined by a through-hole 64 penetrating the piston rod 54 to the upper portion of the hollow chamber 60.

Further, the hollow chamber 60 is formed at the lower end thereof with the second orifice 66 which communicates with the compression chamber CC. Here, the second orifice 66 is defined by a shaft hole 66 which penetrates the neck 546 of the rod extension 544 to the lower portion of the hollow chamber 60 such that the lower portion of the hollow chamber 60 can fluidly communicate with the compression chamber CC through the shaft hole 66.

On the other hand, the bypass passage of the hollow chamber 60 is defined by a groove 68 formed longitudinally to a predetermined length in the hollow chamber 60. The groove 68 provides a passage which connects the upper chamber 60a and the lower chamber 60b divided by the floating piston 160 such that the operating fluid flows between the upper chamber 60a and the lower chamber 60b through the passage.

Accordingly, the shock absorber 50 can provide a reduced damping force by the fluid passing through the groove 68. Further, the shock absorber 50 can adjust characteristics of the damping force by adjusting the cross-sectional area or length of the groove 68.

In the hollow chamber, the upper chamber 60a and the lower chamber 60b are provided with upper and lower springs 69a and 69b that elastically support upper and lower surfaces of the floating spring 160, respectively. The upper and lower springs 69a and 69b elastically support the upper and lower surfaces of the floating spring 160, respectively.

Here, the upper and lower springs 69a and 69b may have different winding numbers or spring constants, thereby making it possible to control damping force variation characteristics in compression or tension.

Further, the upper and lower springs 69a and 69b are constituted by coil springs. Here, the upper and lower springs may be constituted by conical coil springs, each of which has a gradually decreasing radius toward the floating piston 160.

Additionally, the upper and lower surfaces of the body 161 of the floating piston 160 are formed with mounting protrusions 161a and 161b into which the upper and lower springs 69a and 69b are fitted, respectively.

Figure 3:
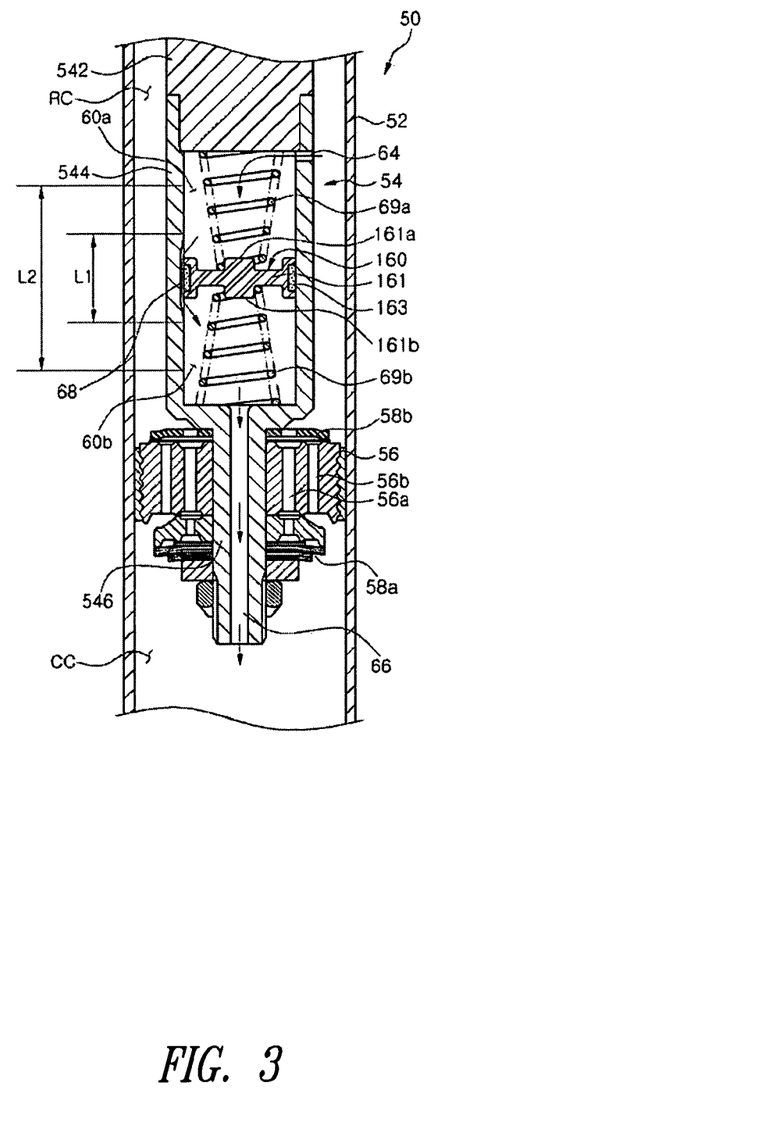
FIG. 3 is a cross-sectional view of the shock absorber of FIG. 2 when generating a very low damping force.

Next, operation of the shock absorber 50 according to one embodiment will be described. First, referring to FIG. 3 showing operation of the shock absorber 50 to generate a very low damping force, a slight displacement of the piston rod 54 causes the floating piston 160 to move within section L1 where the bypass passage is defined by the groove 68. At this time, the displacement of the piston rod 54 causes an operating fluid in one of the upper chamber 60a and the lower chamber 60b to flow toward the other chamber through the groove 68. As a result, the operating fluid in the tensile chamber RC or compression chamber CC is supplied into or discharged from the upper chamber 60a or lower chamber 60b.

In a tensile stroke of the piston rod 54 of the shock absorber 50, that is, when the piston rod 54 is raised, the operating fluid in the tensile chamber RC flows into the upper chamber 60a through the through-hole 64, and then moves into the lower chamber 60b through the groove 68. Further, the operating fluid in the lower chamber 60b is discharged into the compression chamber CC through the shaft hole 66.

Conversely, in a compression stroke of the piston rod 54 of the shock absorber 50, that is, when the piston rod 54 is lowered, the operating fluid in the compression chamber CC flows into the lower chamber 60b through the shaft hole 66. Further, the operating fluid in the lower chamber 60b flows into the upper chamber 60a through the groove 68, and the operating fluid in the upper chamber 60a moves into the tensile chamber RC through the through-hole 64.

In this manner, the shock absorber 50 according to the first embodiment generates a very low damping force while the operating fluid is bypassed from one chamber to the other chamber through the groove 68.

Figure 4:
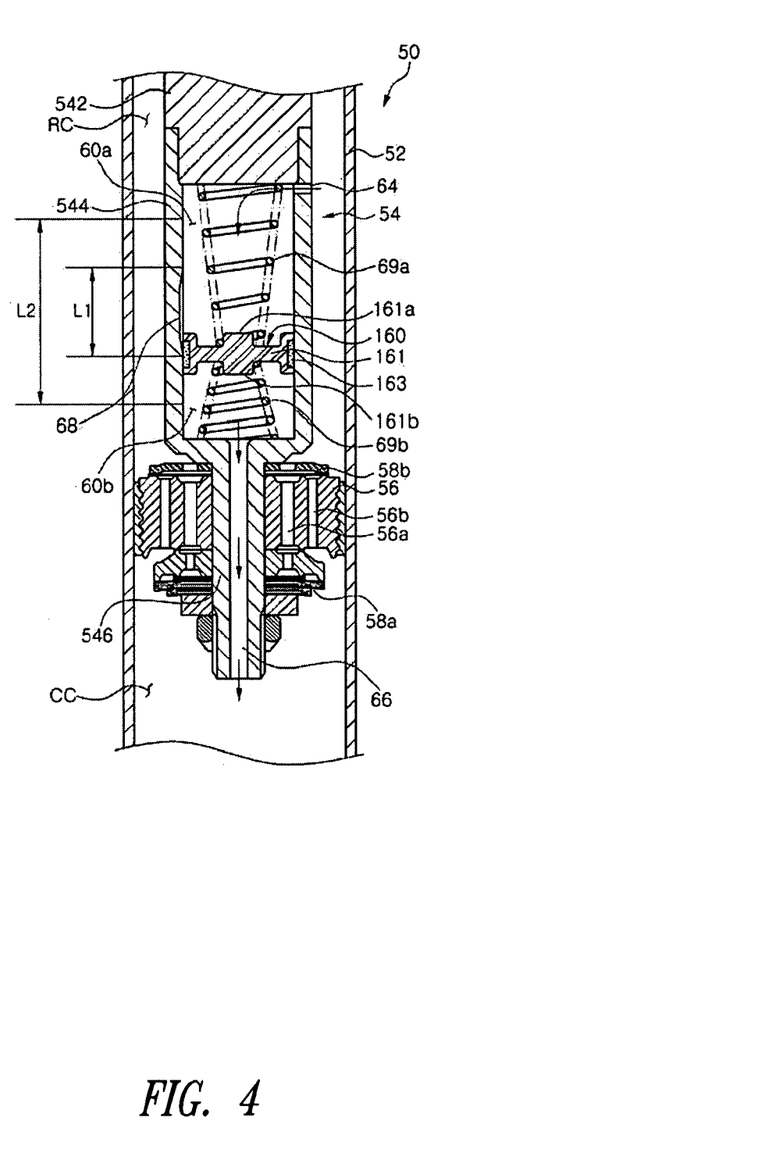
FIG. 4 is a cross-sectional view of the shock absorber of FIG. 2 when generating a low damping force.

Referring to FIG. 4 showing operation of the shock absorber 50 to generate a low damping force, a relatively large displacement of the piston rod 54 causes the floating piston 160 to move between an outer region of the section L1 having the bypass passage defined by the groove 68 and the maximum range of motion L2 of the floating piston 160.

In this case, a resilient force is generated by the upper and lower springs 69a and 69b to rapidly move the floating piston 160.

That is, when the piston rod 54 of the shock absorber 50 is relatively largely displaced, the floating piston 160 is moved between L1 and L2. Further, in the tensile stroke of the piston rod 54, that is, when the piston rod 54 is raised, the floating piston 160 is rapidly moved downward by a restoration force of the upper spring 69a. On the other hand, in the compression stroke of the piston rod 54, that is, when the piston rod 54 is lowered, the floating piston 160 is rapidly moved upward by a restoration force of the lower spring 69b.

Additionally, although the bypass passage defined by the groove 68 is closed by the floating piston 160 in the range of motion of the floating piston 160 between L1 and L2, the operating fluid in the hollow chamber 60 flows into or from the other chamber through the through-hole 64 or the shaft hole 66, so that the low damping force is generated during this operation. At this time, the damping force generated by the shock absorber 50 is higher than the case where the floating piston moves only within the section L1, but is lower than that of a general shock absorber.

Figure 5:
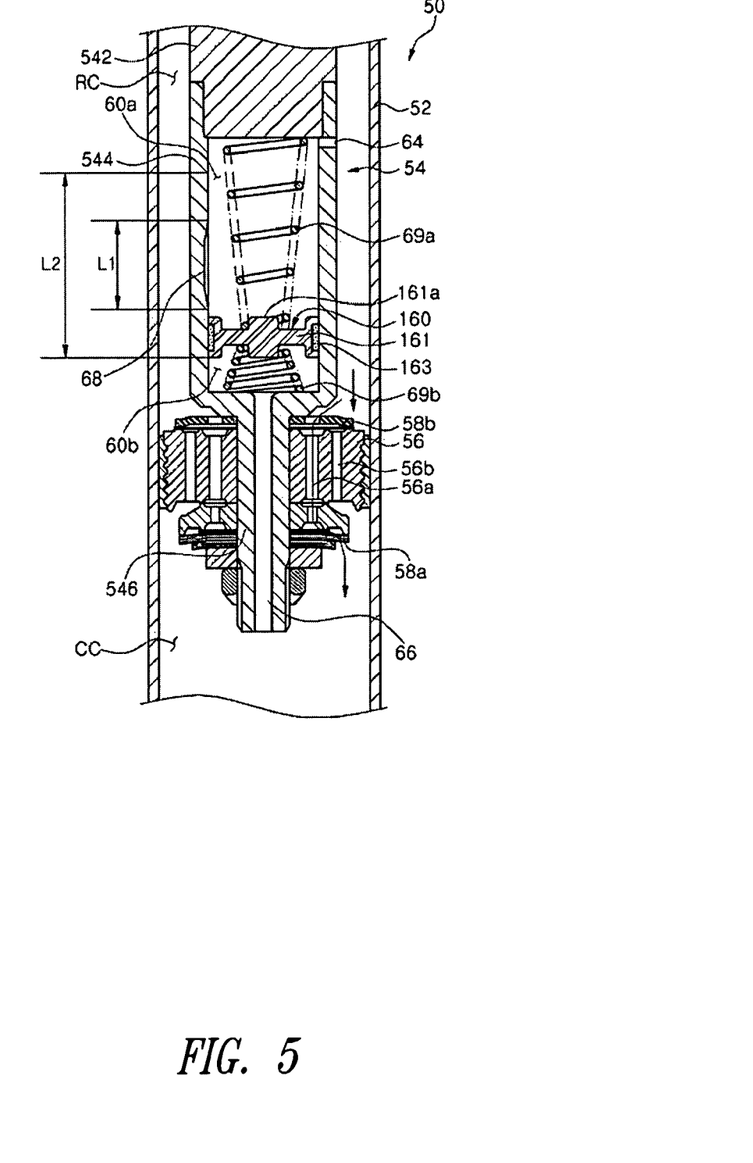
FIG. 5 is a cross-sectional view of the shock absorber of FIG. 2 when generating a high damping force.

Further, referring to FIG. 5 showing operation of the shock absorber 50 to generate a high damping force, a large displacement of the piston rod 54 causes the floating piston 160 to be located on the upper or lower end of the hollow chamber 60, so that the floating piston 160 does not move up or down. At this time, one of the upper and lower springs 69a and 69b is in a minimally compressed state.

Accordingly, the groove 68 is located above or below the floating piston 160, so that the bypass passage is not formed. Further, since the floating piston 160 is not moved up or down, the operating fluid is not moved into or from the hollow chamber 60 through the through-hole 64 or the shaft hole 66.

Hence, the shock absorber 50 generates a high damping force by the piston valve 56.

As such, the shock absorber 50 according to the above embodiment is configured to allow the floating piston 160 to be moved according to a displacement degree of the piston valve 56, in which the bypass passage in the hollow chamber 60 is selectively opened by the floating piston 160, thereby generating multi-stage damping force characteristics. Further, since an initial movement of the floating piston 160 is smoothly performed by the upper or lower spring 69a or 60b, the shock absorber 50 does not undergo a stick slip phenomenon that causes the floating piston to be repetitiously stuck to or separated from the hollow chamber.

Figure 6:
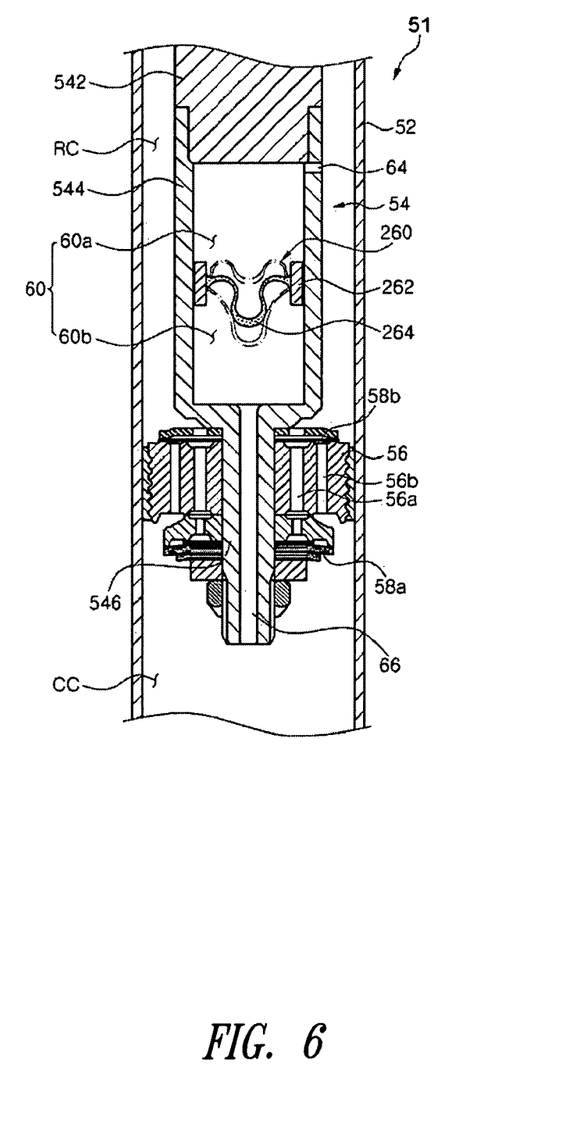
FIG. 6 is a cross-sectional view of a portion of a shock absorber according to another embodiment.

FIG. 6 is an enlarged cross-sectional view of a portion of a shock absorber 51 according to another embodiment. The same components of a shock absorber 51 as those of the shock absorber 50 discussed above will be denoted by the same reference numerals, and a detailed description thereof will be omitted herein.

As shown in FIG. 6, the shock absorber 51 includes a floating piston 260 that reciprocates up and down within the floating chamber 60.

The floating piston 260 includes a ring 262, which moves within the hollow chamber 60 with an outer circumferential surface of the ring 262 contacting an inner surface of the hollow chamber 60. Further, the outer circumferential surface of the ring 262 may be finished with a material, such as Teflon resin, capable of reducing friction between the ring and the hollow chamber.

The ring 262 is provided therein with a flexible moving plate 264 which can be elastically deformed. The flexible moving plate 264 divides the hollow chamber 60 into an upper chamber 60a and a lower chamber 60b, and can be deformed toward the upper or lower chamber 60a or 60b by an operating fluid that flows into or from the upper or lower chamber 60a or 60b.

An outer circumference of the flexible moving plate 264 is disposed on an inner surface of the ring 262, and is preferably integrated to the ring 262 by molding.

Further, the flexible moving plate 264 is formed of an elastic material such as rubber, and has a bent shape such that the flexible moving plate 264 can be easily deformed by the operating fluid which flows into or from the upper or lower chamber 60b or 60b. In other words, the flexible moving plate 264 includes a bent part that is symmetrically formed with respect to the center thereof and is alternately bent up and down.

The flexible moving plate 264 is deformed up or down by the operating fluid which flows into or from the upper or lower chamber 60b or 60b through the first orifice or the second orifice, so that the shock absorber 51 generates a low damping force.

Here, the flexible moving plate 264 has a thin portion according to a location of the bent part to enhance restoration characteristics. For this purpose, the bent part of the flexible moving plate 264 bends upward near the ring 262 and downward near the center thereof. Further, in one aspect, the bent part of the flexible moving plate 264 is thin near the ring and is thick near the center thereof.

Accordingly, the flexible moving plate 264 can be easily restored to an original shape by a difference between restoration forces on the respective portions of the bent part.

Next, operation of the shock absorber 51 according to one embodiment will be described.

Figure 7:
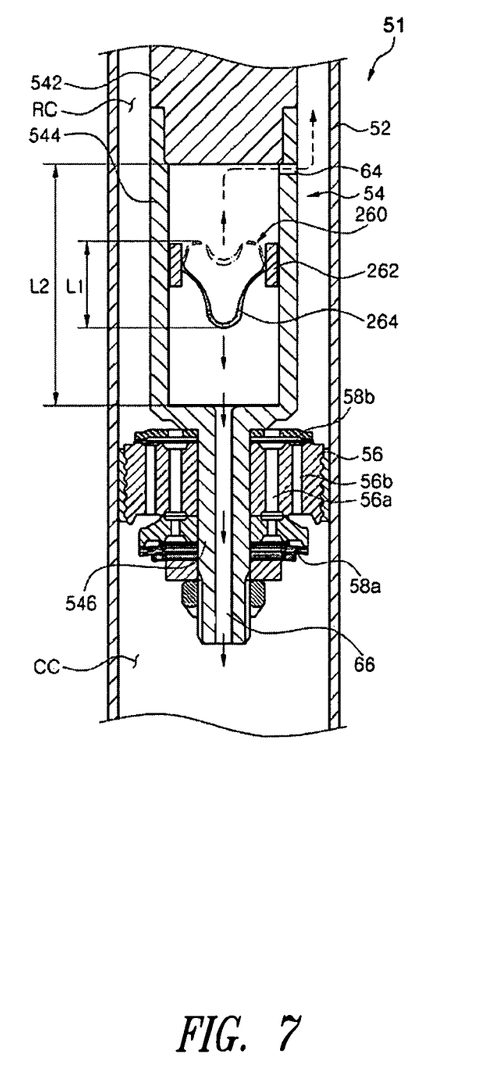
FIG. 7 is a cross-sectional view of the shock absorber of FIG. 6 when generating a very low damping force.

First, referring to FIG. 7 showing operation of the shock absorber 51 to generate a very low damping force, a slight displacement of the piston rod 54 causes the floating piston 260 to move slightly within section L1. In this case, the displacement of the piston rod 54 causes an operating fluid to flow into the hollow chamber 60 through one of the first orifice and the second orifice, and is discharged therefrom through the other orifice.

In other words, in a tensile stroke of the piston rod 54 of the shock absorber 51, that is, when the piston rod 54 is raised, the operating fluid in the tensile chamber RC flows into the upper chamber 60a through the first orifice defined by the through-hole 64. At this time, the flexible moving plate 264 of the floating piston 260 is deformed toward the lower chamber 60b, and the operating fluid in the lower chamber 60b is discharged into the compression chamber CC through the second orifice defined by the shaft hole 66.

Meanwhile, in a compression stroke of the piston rod 54 of the shock absorber 51, that is, when the piston rod 54 is lowered, the operating fluid in the compression chamber CC flows into the lower chamber 60b through the shaft hole 66. At this time, the flexible moving plate 264 of the floating piston 260 is deformed toward the upper chamber 60a. Additionally, the operating fluid in the upper chamber 60a is discharged into the tensile chamber RC through the through-hole 64.

In this manner, when the piston rod 54 is minutely moved, the shock absorber 51 according to the second embodiment generates a very low damping force while the operating fluid is moved within the hollow chamber 60 by deformation of the flexible moving plate 264.

Figure 8:
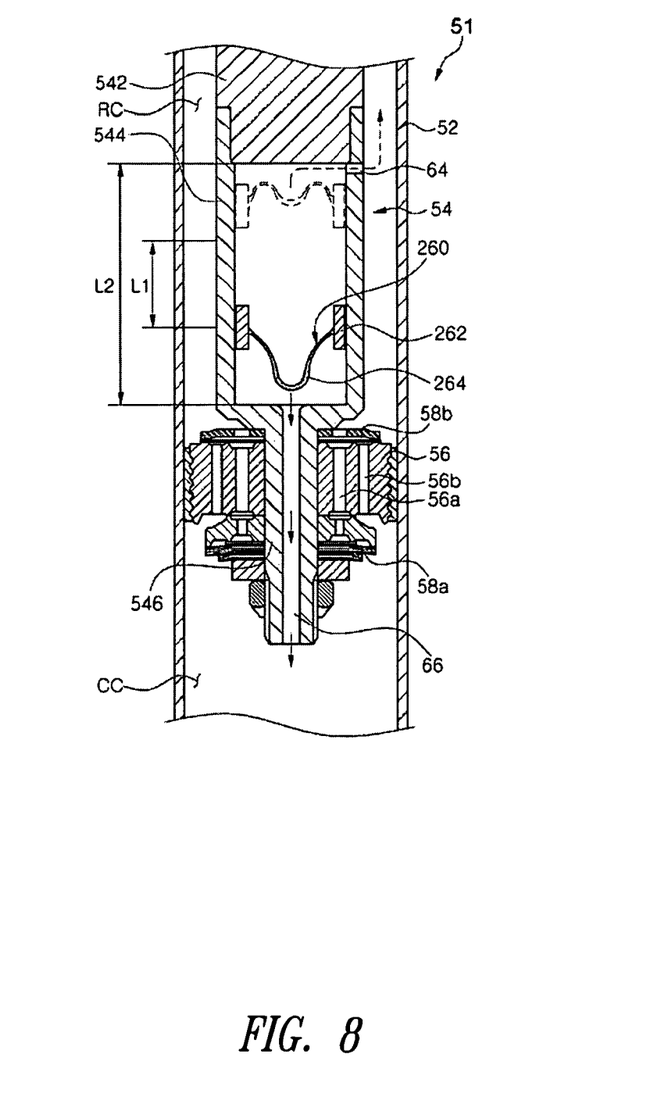
FIG. 8 is a cross-sectional view of the shock absorber of FIG. 6 when generating a low damping force.

Referring to FIG. 8 showing operation of the shock absorber 51 to generate a low damping force, a relatively large displacement of the piston rod 54 causes the floating piston 260 to move between an outer region of the section L1 and the maximum range L2 of motion of the floating piston 260 while the flexible moving plate 264 is deformed at the same time.

Further, in the tensile stroke of the piston rod 54, that is, when the piston rod 54 is raised, the floating piston 260 is lowered while the flexible moving plate 264 is deformed downward at the same time. Accordingly, the operating fluid in the tensile chamber RC is supplied to the upper chamber 60a, while the operating fluid in the lower chamber 60b is discharged to the compression chamber CC.

On the other hand, in the compression stroke of the piston rod 54, that is, when the piston rod 54 is lowered, the floating piston 260 is raised while the flexible moving plate 264 is deformed upward at the same time. As a result, the operating fluid in the compression chamber CC is supplied to the lower chamber 60b, while the operating fluid in the upper chamber 60a is discharged to the tensile chamber RC.

In this manner, the shock absorber 51 generates a low damping force by deformation of the flexible moving plate 264 and the displacement of the floating piston 260. At this time, the damping force generated by the shock absorber 51 is higher than the case where the floating piston 260 moves only within the section L1, but is lower than that of a general shock absorber.

Figure 9:
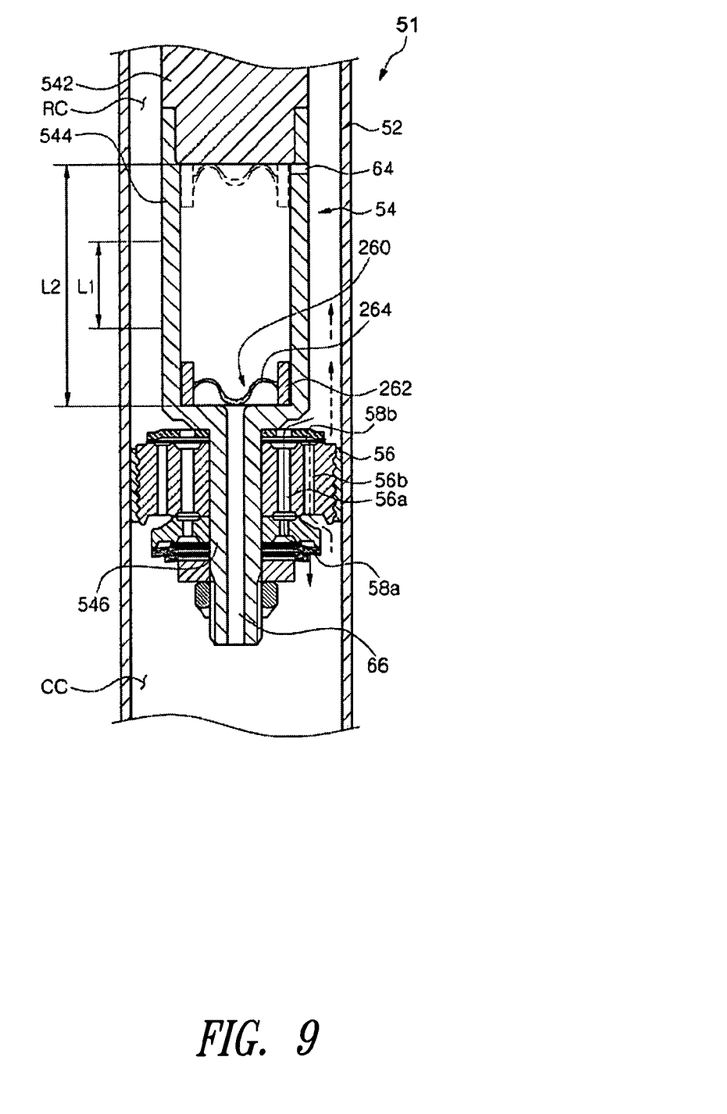
FIG. 9 is a cross-sectional view of the shock absorber of FIG. 6 when generating a high damping force.

Further, referring to FIG. 9 showing the operation of the shock absorber 51 to generate a high damping force, a large displacement of the piston rod 54 causes the floating piston 260 to be located on the upper or lower end of the hollow chamber 60, so that the floating piston 260 does not move up or down. Additionally, the flexible moving plate 264 is brought into close contact with the upper or lower end of the hollow chamber 60.

At this time, the through-hole 64 and the shaft hole 66 are closed by the floating piston 260, so that the operating fluid does not flow into the hollow chamber 60 or is not discharged therefrom.

Hence, the shock absorber 51 generates a high damping force by the piston valve 56.

As such, the shock absorber 51 according to this embodiment is configured to allow the floating piston 260 to be moved or to allow the flexible moving plate 264 to be deformed according to a displacement degree of the piston valve 56 to reduce the damping force. Further, the floating piston 260 is moved or the flexible moving plate 264 is deformed according to the displacement degree of the piston valve 56, thereby generating multi-stage damping force characteristics. In this manner, the shock absorber 51 provides a variable damping force by the deformation of the flexible moving plate in movement of the piston rod 54. Here, the flexible moving plate deforms before the movement of the floating piston 260 to allow an initial smooth movement of the floating piston 260, so that the shock absorber 51 does not undergo the stick slip phenomenon that causes the floating piston to be repetitiously stuck or separated to the hollow chamber.

As apparent from the above description, according to one aspect of the present invention, the shock absorber is configured to allow an operating fluid in one part of a hollow chamber to flow to the other part of the hollow chamber through a bypass passage by a slight displacement of a piston rod, thereby generating a very low damping force and improving driving comfort. Further, a shock absorber according to embodiments of the present invention can control a variable degree of the damping force by changing the width, length and depth of a groove, and the like. Moreover, in a compression or tensile stroke, an initial movement of the floating piston can be smoothly performed by springs, thereby preventing the stick slip phenomenon and noise resulting from contact between the floating piston and the hollow chamber.

Additionally, according to another aspect, the shock absorber is configured to allow an operating fluid to move along with deformation of a flexible moving plate in the hollow chamber by a slight displacement of the piston rod, thereby generating a very low damping force and improving driving comfort. Further, a shock absorber according to embodiments of the present invention can control the variable degree of the damping force by changing the thickness or bent shape of the flexible moving plate. Moreover, since the flexible moving plate is continuously deformed during movement of the piston rod, the initial movement of the floating piston can be smoothly performed to prevent the stick slip phenomenon and noise resulting from the contact between the floating piston and the hollow chamber.

Further, a shock absorber according to embodiments of the present invention can generate a suitable damping force according to a driving state of a vehicle by gradually changing the damping force depending on the displacement of the piston rod to improve driving comfort, and can also generate a high damping force when the vehicle is driven uphill or through a corner, thereby maintaining driving stability of the vehicle.

Although the present invention has been described with reference to the embodiments and the accompanying drawings, it should be noted that the present invention is not limited to the aforementioned embodiments, and that various modifications and equivalent embodiments can be made without departing from the spirit and scope of the present invention, as defined only by the accompanying claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A shock absorber comprising:
   a cylinder;
   a piston valve connected to a piston rod within the cylinder to divide the cylinder into a first chamber and a second chamber;
   a hollow chamber formed within the piston rod;
   first and second orifices formed in upper and lower ends of the hollow chamber and in fluid communication with the first and second chambers, respectively;
   a floating piston disposed within the hollow chamber to move up and down and to divide the hollow chamber into upper and lower chambers; and
   a mechanism positioned in the hollow chamber to move an operating fluid above and below the floating piston,
   wherein the moving mechanism includes a flexible moving plate disposed within the floating piston and configured to be deformed toward the upper or lower chamber during operation,
   wherein the floating piston comprises a ring, the ring having an inner surface, at least a portion of an outer circumference of the flexible moving plate being coupled to at least a portion of the inner surface of the ring at a coupling location, and
   wherein at least a portion of the flexible moving plate is above the coupling location when the flexible moving plate is deformed toward the upper chamber and is below the coupling location when the flexible moving plate is deformed toward the lower chamber.

2. The shock absorber according to claim 1 wherein an outer surface of the ring contacts an inner surface of the hollow chamber, and the flexible moving plate includes a bent part symmetrically formed with respect to a center of the bent part and alternately bent up and down.

3. The shock absorber according to claim 2 wherein the bent part is thin near the ring and is thick at the center of the bent part.

4. The shock absorber of claim 2 wherein the bent part includes an outer circumference disposed on the inner surface of the ring.

\* \* \* \* \*